Figure 1:
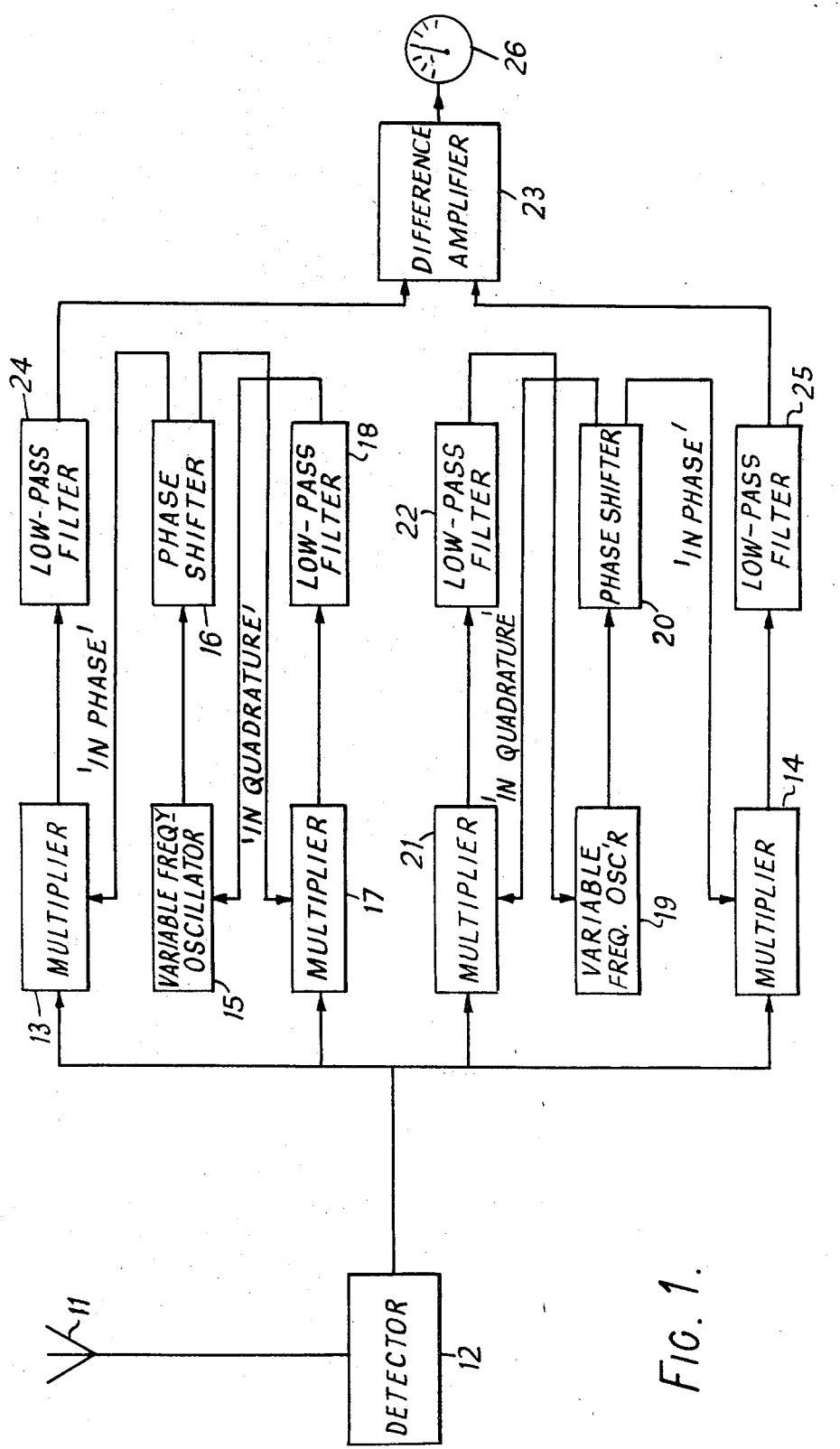

United States Patent
Mansfield et al.

[15] 3,691,467
[45] Sept. 12, 1972

[54] DEMODULATING APPARATUS

[72] Inventors: Michael Patrick Mansfield, Ingatestone; Howard John Prangnell, Harlow, both of England

[73] Assignee: A. C. Cossor Limited, Harlow, Essex, England

[22] Filed: April 22, 1970

[21] Appl. No.: 30,782

[30] Foreign Application Priority Data

April 22, 1969 Great Britain..........20,607/69

[52] U.S. Cl. ....................325/363, 343/108, 325/60
[51] Int. Cl. ..............................................H04b 1/00
[58] Field of Search ..343/108, 112; 325/49, 60, 307, 325/329, 433, 435, 363; 179/15 P, 15 AL; 328/166

[56] References Cited

UNITED STATES PATENTS

| | | | |
|---|---|---|---|
| 3,332,081 | 7/1967 | Lunn et al. | 343/108 |
| 2,924,706 | 2/1960 | Sassler | 325/329 |
| 3,482,247 | 12/1969 | Thompson | 343/108 |
| 3,384,824 | 5/1968 | Kennier | 325/49 |
| 3,171,127 | 2/1965 | Asteraki et al. | 325/307 |

Primary Examiner—Robert L. Griffin
Assistant Examiner—Barry Leibowitz
Attorney—Dike, Bronstein, Roberts & Cushman

[57] ABSTRACT

Demodulating apparatus for indicating the difference in depth of modulating of a carrier oscillation by two modulating signals of different frequencies $f_1$ and $f_2$ comprising an aerial with a detector which provides an input to two switching modulators. A first variable-frequency oscillator providing a first reference signal of substantially the same frequency and phase as the signal of frequency $f_1$ is connected to an input of one of the modulators. A second variable-frequency oscillator providing a second reference signal of substantially the same frequency and phase as the signal of frequency $f_2$ is connected to an input of the other modulators. The outputs of the modulators are connected through low-pass filters to a differential amplifier with an associated meter for indicating the difference in the magnitudes of the d.c. components of the outputs of the two modulators.

6 Claims, 2 Drawing Figures

DEMODULATING APPARATUS

The present invention relates to a demodulating apparatus for indicating the difference in depths of modulation of two components of a composite signal. The apparatus can be fitted to aircraft for use with an Instrument Landing System (I.L.S.)

In the known I.L.S. two carriers of the same frequency are modulated with tones of different frequencies. The carriers are transmitted in narrow beams at small angles to the runway and to opposite sides of the prescribed path of approach for an aircraft. The difference in the depths of modulation of the carriers with the two tones relative to the combined carrier amplitude is proportional to the angular distance from the correct course at a given distance from the airfield. There is no difference in the depth of modulation on the correct line of approach.

The present invention provides an apparatus for indicating the difference in depths of modulation of a carrier oscillation by two modulating signals of different frequencies $f_1$ and $f_2$ including an input which is connected to two multipliers, means for providing to one of the multipliers a first reference signal of substantially the same frequency and phase as the signal of frequency $f_1$, means for providing to the other multiplier a second reference signal of substantially the same frequency and phase as the signal $f_2$, the first and second reference signals being of the same constant amplitude, and means for providing an indication of the difference in the magnitudes of the d.c. components of the outputs of the two multipliers.

In using such apparatus in an aircraft when landing using the I.L.S. the pilot steers his aircraft in such a way to tend to maintain the indication from the apparatus at zero.

Figure 2:
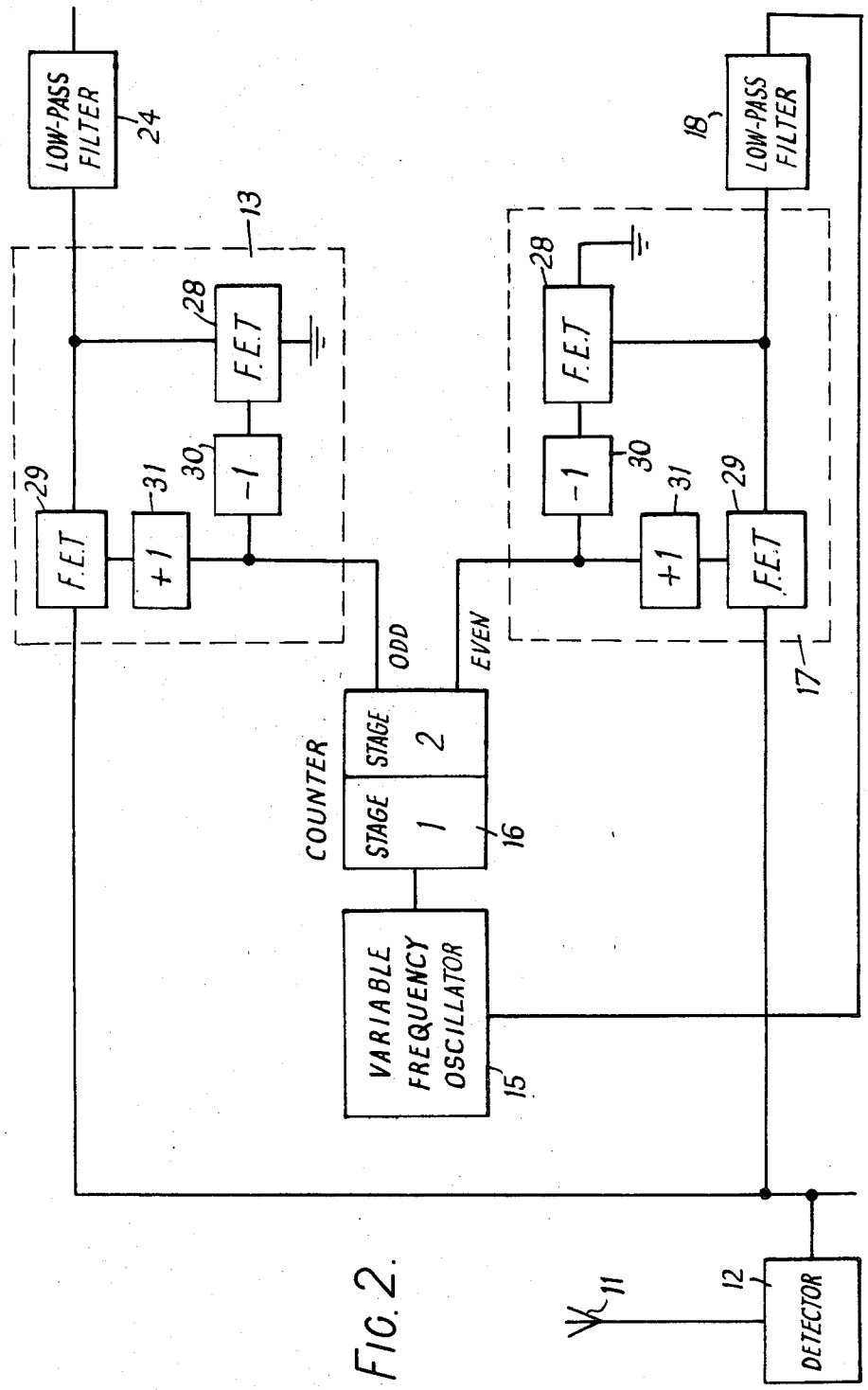

An embodiment of the invention will now be described by way of example with reference to the accompanying drawing of which the FIG. 1 is a block diagram of the embodiment and FIG. 2 is a block diagram of part of the embodiment of FIG. 1 in more detail.

An aerial 11 is connected to a detector 12 which provides a common input to two multipliers 13 and 14.

A reference signal for a first 13 of the multipliers is provided by a variable-frequency oscillator 15 which is connected to one input of the multiplier 13 through a phase shifter 16. The phase shifter 16 is also connected to one input of a first subsidiary multiplier 17. The other input of the multiplier 17 is provided by the detector 12 and the output is connected to the variable-frequency oscillator 15 through a low pass filter 18.

Similarly a reference signal for the second multiplier 14 is provided by a variable-frequency oscillator 19 which is connected to one input of the multiplier 14 through a phase-shifter 20. The phase-shifter 20 is also connected to one input of a second subsidiary multiplier 21. The other input of the multiplier 21 is provided by the detector 12 and the output is connected to the variable-frequency oscillator 19 through a low-pass filter 22.

The outputs of the multipliers 13 and 14 are fed to two inputs respectively of a difference amplifier 23 through low-pass filters 24 and 25. The output of the amplifier 23 is connected to a meter 26.

A signal falling on the aerial 11 and consisting of two carriers of the same frequency and phase and modulated with tones of different frequencies (90 Hz and 150 Hz for example), is detected by the detector 12 to give a signal $$A[1 + m \sin \omega_{90} t + n \sin(\omega_{150} T + \phi)]$$

where $A$ is the amplitude of the combined carrier signal in the absence of modulation, $m$ is the depth of modulation of the tone of angular frequency $\omega_{90}$ $n$ is the depth of modulation of the tone of frequency $\omega_{150}$ and $\phi$ is the initial phase difference between the tones. In the multiplier 13 this signal is multiplied by a reference signal of the same frequency as one component (90 Hz, for example) and of a constant amplitude B. The output of the multiplier 13 is therefore $$A[1 + m \sin \omega_{90} t + n \sin(\omega_{150} t + \phi)]B \sin(\omega_{90} t + \phi$$

where $\theta$ is the phase difference between the reference signal and the component. The d.c. component of this output is $(ABm/2) \cos \theta$.

The low pass filter 24 allows only the d.c. component of the output from the multiplier 13 to pass to the difference amplifier. By locking the reference signal substantially in phase with the component of the input of the same frequency, $\theta$ becomes very small and $\cos \theta$ is approximately unity. The input to the difference amplifier is then approximately $ABm/2$.

Similarly, in the multiplier 14 the input is multiplied with a reference signal of the same frequency and phase as the 150 Hz component of the input, $\sin(\omega_{150} t + \phi)$. The amplitude of this reference signal, B, is the same as the amplitude of the reference signal fed to the multiplier 13. The d.c. component of the output of the multiplier 14 which passes through the low-pass filter 25 to the second input of the difference amplifier 23 is $ABn 2$.

The difference amplifier 23 produces an output which is proportional to $(m - n)$, the difference in depth of modulation with respect to the combined carrier amplitude. This output is applied to the meter 26.

The reference signals are produced by the variable frequency oscillators 15 and 19. The signals from the oscillators are fed to the multipliers 13 and 14 through the phase shifters 16 and 20. There is no phase change in the signals passing to the multipliers 13 and 14 in the phase shifters, but signals in quadrature with the inputs to the phase shifters pass from them to the multipliers 17 and 21. The input from the detector 12 is multiplied by the quadrature signals in the multipliers 17 and 21 to give outputs $$A[1 + m \sin \omega_{90} + n \sin(\omega_{150} t + \phi]b \cos(\omega_{90} t + \phi$$

and $A[1 + m \sin \omega_{90} t + n \sin(\omega_{150} t + \phi]B \cos(\omega_{150} t + \phi + \delta)$ respectively, where $\delta$ is the difference in phase between the reference signal and the corresponding component of the input. The d.c. components of the outputs from the modulators 17 and 21 which pass through the low-pass filters 18 and 22 are proportional to $\sin \theta$ and $\sin \delta$ respectively. By using high gain in the feedback low-pass networks to the variable frequency oscillators the difference in the phases $\theta$ and $\delta$ can be made negligibly small.

Preferable the oscillators vibrate at a multiple of the frequency required and the phase shifters digitally divide the signals to provide the in-phase and quadrature signals.

For example, in FIG. 2 the variable-frequency oscillator 15 oscillates at four time the reference frequency. The oscillations are divided by the phase shifter 16 which is in the form of a two-stage binary counter. Each stage comprises a flip-flop circuit, the input of the second stage being fed with one of the outputs of the flip-flop circuit of the first stage. Thus, the input of the second stage is a train of pulses of twice the reference frequency. The two outputs of the flip-flop circuit of the second stage are used to provide the in-phase and quadrature signals. The first output emits a pulse when the count of pulses from the first stage is odd, and the second emits a pulse when the count of pulses is even. The first output provides the in-phase signals and the second provides the quadrature signal.

The multipliers of FIG. 2 comprises shunt-and series-connected field-effect transistors (F.E.T.) 28 and 29. The shunt-connected transistors provide short circuits to earth when they conduct. The F.E.T.s are driven by respective drivers 30 and 31 which are actuated by the outputs from the counter. The drivers 30 invert the signals from the outputs of the counter so that the F.E.T.s 28 operate in antiphase with the F.E.T.s 29. Thus the multipliers 13 and 17 operate as switching modulators. The low-pass filters 24 and 18 allow only the d.c. components of the outputs of the multipliers to pass. As only components of the multiplying signals from the counters of the same frequency as the tones modulating the carrier signal produce d.c. components, only the fundamental sinusoidal components of the square waveform of signals from the counters need be considered, and therefore the mathematical analysis given above applies.

The output of the low-pass filter 18 is used to control the phase, and hence the frequency of the variable-frequency oscillator 15. The output of the low-pass filter 24 is fed to the difference amplifier as described above.

In the I.L.S., the aircraft is on course when the depths of modulation of the two tones are equal. When using the apparatus for aircraft landing, there is no output form he difference amplifier when the aircraft is on course and the meter gives a center reading. On a deviation to one side of the prescribed course a positive signal is produced by the amplifier 23 an the needle of the meter 26 is deflected to one side of the center-position. On a deviation to the other side of the prescribed course, a negative signal is produced by the amplifier 23 and the needle of the meter 26 is deflected to the other side of the center-position. The pilot can steer his aircraft along the prescribed course by keeping the needle of the meter 26 in the central position.

We claim:

1. An apparatus for indicating the difference in depths of modulation of an input carrier oscillation signal by two modulating signals of different frequencies $f_1$ and $f_2$ comprising:
   two multipliers;
   said input signal connected to the two multipliers;
   means for providing to one of the multipliers a first reference signal of the same frequency and phase as the signal of frequency $f_1$, said one multiplier producing an output having a d.c. component;
   means for providing to the other multiplier a second reference signal of the same frequency and phase as the signal of frequency $f_2$, the first and second reference signals being of the same amplitude, said other multiplier producing an output having a d.c. component;
   and means for providing an indication of the difference in the magnitudes of the d.c. components of the outputs of the two multipliers.

2. An apparatus as claimed in claim 1 wherein each of said means for providing a reference signal comprises: a variable frequency oscillator having a frequency-and-phase control and two outputs providing signals in quadrature with one another; a first of said output being connected to one of said multipliers; a subsidiary multiplier connected to the said input, the second output being connected to the subsidiary multiplier; and a low-pass filter, an output of said subsidiary multiplier being connected to the frequency and phase control of the oscillator through the low-pass filter; whereby the output of said low-pass filter controls the phase and frequency of said variable frequency oscillator so as to maintain the output from said oscillator at the same frequency and phase as the corresponding modulating signal of said input.

3. An apparatus as claimed in claim 2 wherein the oscillator is arranged to vibrate at a multiple of the frequency of the reference signal, and in which the means for providing a reference signal further include a phase shifter which digitally divides the oscillation to provide the two output signals in quadrature.

4. An apparatus as claimed in claim 1 wherein the input comprises an aerial and a detector.

5. An apparatus as claimed in claim 1 wherein the multipliers are switching modulators.

6. An apparatus as claimed in claim 1 wherein the means for providing an indication comprise two low-pass filters and a difference amplifier with an associated meter, the two multipliers being connected to the difference amplifier through the two low-pass filters; whereby said two low-pass filters derive said d.c. components from the outputs of said two multipliers and said difference amplifier provides an indication of the difference between said two d.c. components.

* * * * *